(12) United States Patent
Monti

(10) Patent No.: US 7,958,987 B2
(45) Date of Patent: Jun. 14, 2011

(54) METHOD FOR TRANSFERRING ARTICLES FROM A FIRST MACHINE TO A SECOND MACHINE WHICH PACKS THE ARTICLES IN RELATIVE CONTAINERS

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 284 days.

(21) Appl. No.: 12/413,974

(22) Filed: Mar. 30, 2009

(65) Prior Publication Data
US 2009/0257861 A1   Oct. 15, 2009

(30) Foreign Application Priority Data
Apr. 14, 2008   (IT) ............................. BO2008A0225

(51) Int. Cl.
*B65G 47/46* (2006.01)
(52) U.S. Cl. ............... 198/357; 198/370.07; 198/465.2; 198/575; 198/347.1
(58) Field of Classification Search ............... 198/357, 198/363, 370.01, 370.07, 465.2, 575, 580, 198/347.1
See application file for complete search history.

(56) References Cited

U.S. PATENT DOCUMENTS

| | | | |
|---|---|---|---|
| 3,880,298 A * | 4/1975 | Habegger et al. | 198/349.95 |
| 6,315,101 B1 * | 11/2001 | Hugon | 198/370.07 |
| 6,325,198 B1 * | 12/2001 | Pattantyus-Abraham et al. | 198/339.1 |
| 6,585,101 B2 * | 7/2003 | Edwards et al. | 198/370.06 |
| 6,715,598 B2 * | 4/2004 | Affaticati et al. | 198/357 |
| 6,918,484 B2 * | 7/2005 | Affaticati et al. | 198/357 |
| 7,051,863 B2 * | 5/2006 | Fujimura et al. | 198/575 |
| 7,562,760 B2 * | 7/2009 | Affaticati et al. | 198/357 |
| 2004/0200692 A1 * | 10/2004 | Tanaka | 198/349 |

FOREIGN PATENT DOCUMENTS

GB    2040244 A    8/1980
WO    WO2006/125703 A    11/2006

OTHER PUBLICATIONS

International Search Report.

* cited by examiner

*Primary Examiner* — Mark A Deuble
(74) *Attorney, Agent, or Firm* — William J. Sapone; Coleman Sudol Sapone P.C.

(57) ABSTRACT

A method for transferring articles from a first to a second machine, which packs the articles in containers, using a transport line, interposed between the machines, which removably receives and moves the trays, each tray affording at least a seating complementarily shaped to an article, as well as at least two stores, for receiving the trays, respectively associated to a first station located at a start of the line and a second station located downstream of the first station with a first store containing a predetermined number of empty trays, the method comprising a partial filling of the second store with trays containing articles, and is such that a temporary malfunctioning of the first machine maintains the second machine in service up to emptying of the second store, and a temporary malfunctioning of the second machine maintains the first machine in service up to complete filling of the second store.

26 Claims, 6 Drawing Sheets

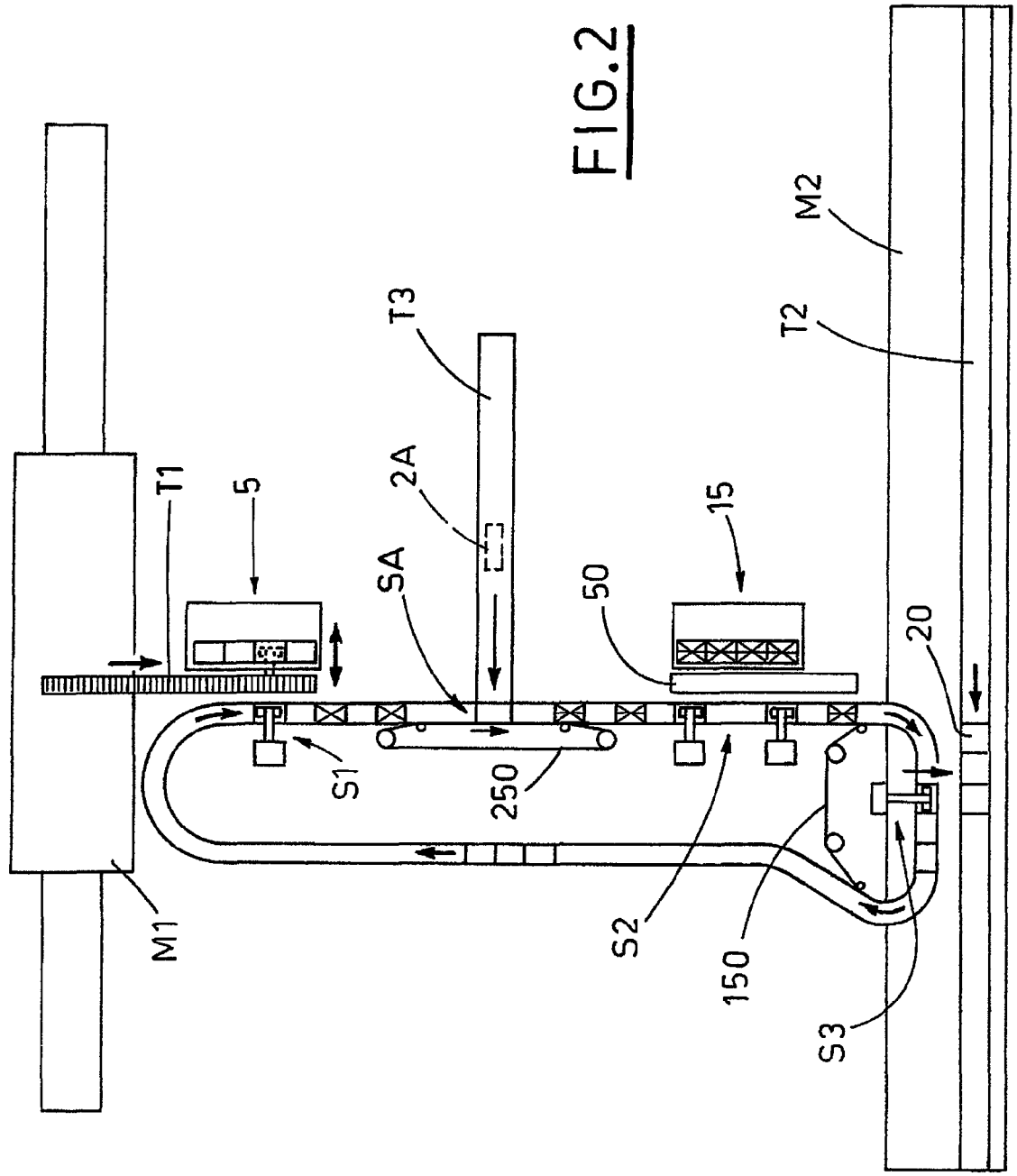

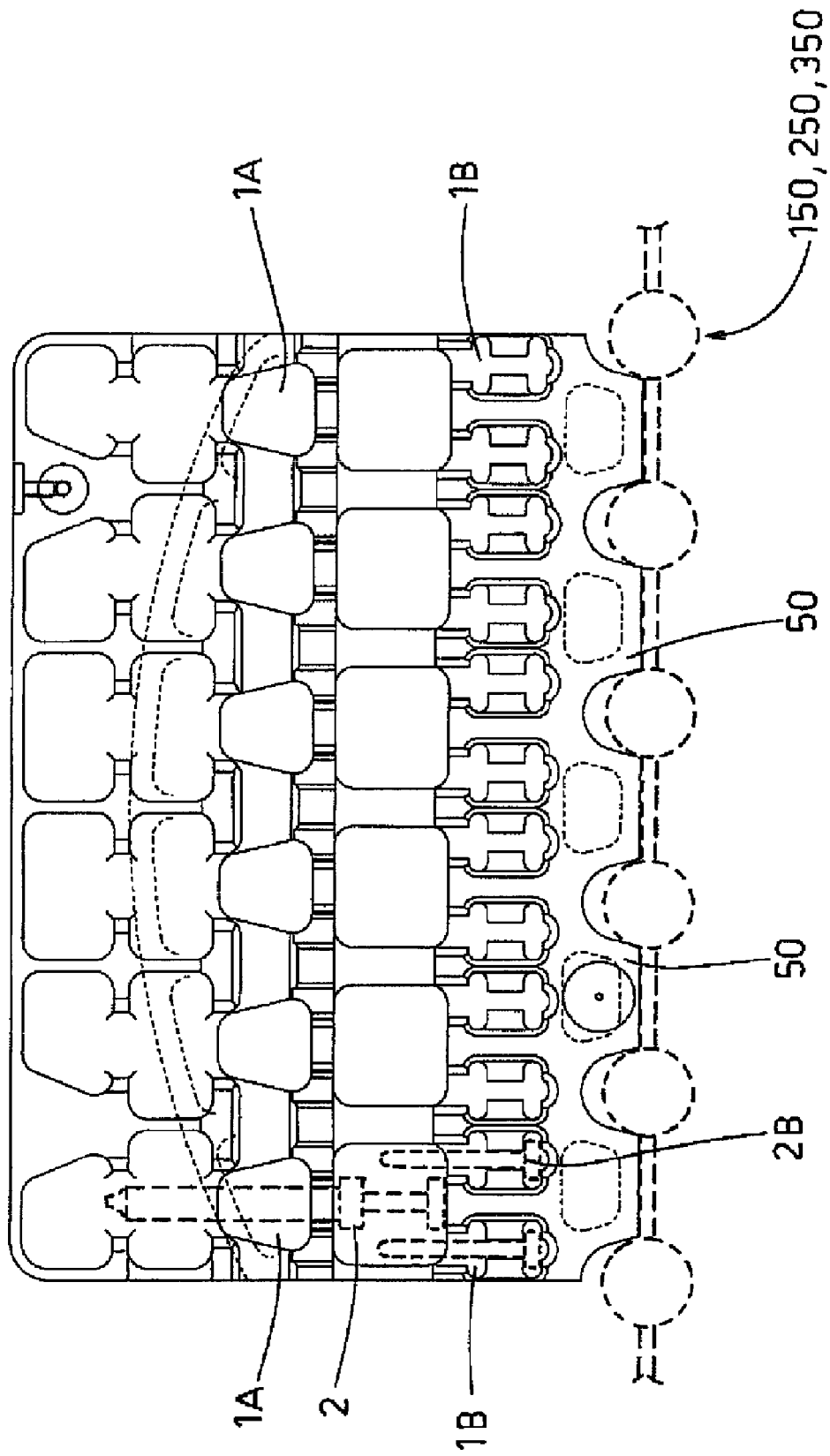

METHOD FOR TRANSFERRING ARTICLES FROM A FIRST MACHINE TO A SECOND MACHINE WHICH PACKS THE ARTICLES IN RELATIVE CONTAINERS

BACKGROUND OF THE INVENTION

The invention relates to the technical sector of methods for transferring articles between two automatic machines arranged in line.

The simplest method is performed using a transport line which collects the articles exiting from the first machine in order to transfer them to the second machine.

This method is rather "rigid" in the sense that it is able to perform the relative tasks only under regular functioning conditions of both the upstream and the downstream machines.

In many applications there is the need to make this transfer more flexible, such that it can overcome temporary malfunctioning or short unforeseen halts in a machine without having repercussions on the other machine.

There exist various types of machines which, because of their intrinsic characteristics, incur negative effects from even a brief halt caused by malfunctioning of another machine, functionally associated thereto.

In order to obtain the desired characteristics of flexibility, transfer methods occasionally employ temporary stores, also known as buffers, suitable for the specific purposes of at least one or possibly both of the machines involved.

In some cases, in which the more "delicate" machine is upstream, the buffers are for housing the articles coming from it when the downstream machine is momentarily out of commission.

Thereafter, once regular functioning of the downstream machine has been restored, the accumulation of articles in the buffer can be disposed of in various ways, according to possibilities as follow:

- if the downstream machine is able to go faster than the upstream machine, the accumulation can be gradually dispensed of;
- if, on the other hand, the downstream machine is not able to go faster than the upstream machine, either the speed of the upstream machine is temporarily reduced or, alternatively, the build-up is manually removed from the buffer, kept off-line and possibly re-introduced at the end of the batch.

In other cases, in which the more delicate machine is downstream, the buffers are preliminarily filled, anticipating the start-up of the upstream machine with respect to the downstream machine; in this way the accumulation of articles in the buffer guarantees a reserve supply for the downstream machine if the upstream machine is faulty.

At the end of the batch, the buffer is emptied.

For particularly fragile articles (e.g. glass vials, glass syringes, etc.) the means for performing the transfer, as well as the buffer devices, must be conformed such as not to lead to, or at most to reduce to an insignificant minimum, impacts between the articles in order to prevent damage; these technical-functional aspects are obtainable only at considerable cost.

The operating modalities of the system, which include the emptying of the articles in the buffer at the end of work, can become incompatible with the requirements of certain products which, for example, are damaged or altered if kept for too long at higher-than-predetermined temperatures: in fact the temperature is not controlled in the buffer and depends on the environment the machines are located in.

SUMMARY OF THE INVENTION

The main aim of the present invention is to provide a method which apart from enabling transfer of articles from a first machine to a second machine which packs the articles in relative containers, does not lead to halting a machine in the presence of a shut-down and/or a temporary malfunction of the other machine and is such as to re-establish operating conditions following the removal of the causes which have caused the shut-down and/or the malfunctioning.

A further aim of the present invention is also to provide a method in which the operating stages enable articles coming from the upstream first machine to be loaded into transport trays, and the supply of the trays containing these articles to an emptying station associated to the second machine, without the articles being subjected to impacts and/or damage, and with the need, on request, to contain the transit of articles from the first machine to the second machine within a predetermined time.

A further aim of the invention consists in providing a method which can be configured according to needs, starting from a basic operating system, to enable supplementary articles and accessory articles to be loaded in the transport trays, apart from the articles dispensed by the first machine, on their way towards the second machine.

A further aim of the invention consists in providing a method the functioning of which is extremely flexible and able to adapt in real-time to the various situations which might obtain in one or the other of the machines, or in any devices dispensing supplementary or accessory articles.

A further aim of the invention relates to actuating the method using operating stages as simple as possible and/or using known operating systems, with the aim of guaranteeing maximum reliability of results.

The aforementioned aims are obtained by a method for transferring articles from a first machine to a second machine which packs the articles in relative containers, actuation of which involves the use of a closed-ring transport line, interposed between the machines, for removably receiving and moving trays, each tray affording at least a seating shaped to complementarily receive an article, and a use of at least two stores, namely a first store and a second store for receiving the trays, the first store being associated to a first station located at a start of an outward branch of the line and the second store being associated to a second station located downstream of the first station in an advancement direction of the outward branch, the first store containing a predetermined number of trays at least before activation of the method, the method comprising:

a preliminary aspect which includes following preliminary stages: intermittent positioning of trays in the first station with the trays coming either from a return branch of the line or collected from the first store;

inserting at least an article in the seating of each tray located in the first station;

transporting each tray containing the article via the line to the second station;

transferring the trays from the second station to the second store up until the second store is partially filled up to a predetermined level; and an operative aspect, following the preceding preliminary aspect, which comprises following operating stages: activating the second machine; transporting, via the line, each tray from the first station to a third station, passing through the second station, with the third station being associated to a second transporter of the second machine, which second transporter carries the containers; picking-up at least an article from each tray positioned in the third station and location thereof in a corresponding container of the second transporter, with successive transport, via the line, of the tray when emptied of the article, from the third station to the first station along the return branch of the line; using the empty trays, in a timed relation with an arrival thereof carried on the line upstream of the first station, alternatively to the trays situated in the first store, for filling the empty trays carried on the line with corresponding articles collected from the first transporter; repeating said operating stages.

BRIEF DESCRIPTION OF THE DRAWINGS

The characteristics of the invention will be made evident in the following description of some possible configurations of the system, in accordance with what is reported in the claims and with the aid of the accompanying figures of the drawings, in which:

FIG. 2 illustrates, similarly to FIG. 1, a configuration also comprising a first auxiliary station interposed between the first and the second station;

FIG. 4 is a plan view of a tray, of known type, for transport of predetermined articles, as well as auxiliary articles;

DESCRIPTION OF THE PREFERRED EMBODIMENTS

Figure 1:
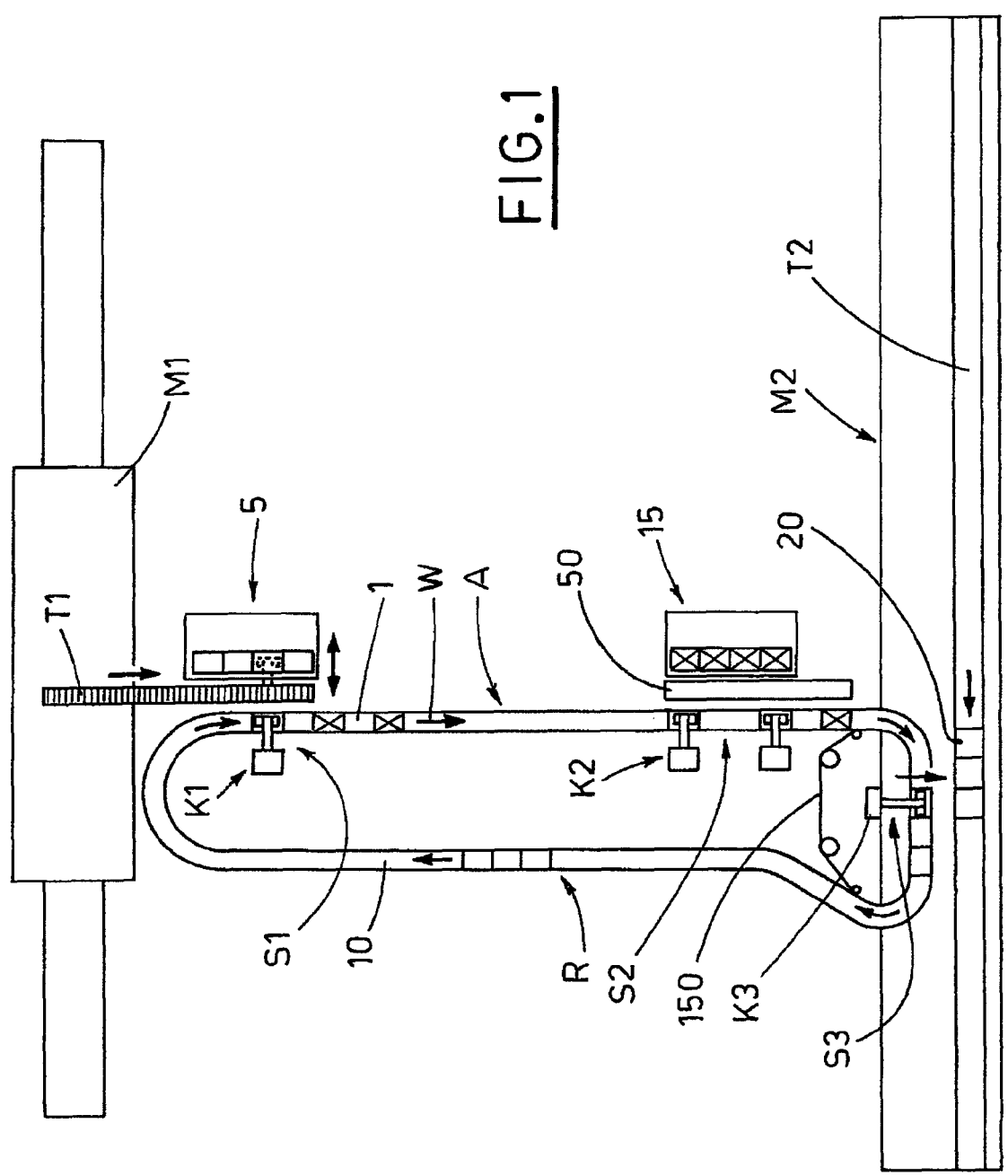
FIG. 1 schematically illustrates, in plan view, a basic configuration of an operating system for actuating the method of the invention, comprising three stations and two stores.

With reference to FIGS. 4-6, 1 denotes a tray, known as a godet by technical experts in the sector, which offers seatings 1A, 1B destined to receive articles 2 and auxiliary articles 2A; by way of example the articles 2 are constituted by syringes containing a predetermined substance, and the auxiliary articles 2A are constituted by needles couplable with the syringes.

The tray exhibits, in an external wall thereof, a sort of cogging 50 which will be more fully explained herein below.

With reference to FIGS. 1-3, 10 denotes a closed-ring conveyor line conformed, in a known way, for removably receiving the trays 1 and to move them by known means, not illustrated as not pertaining to the invention, through the various stations, of which more will be explained hereinbelow.

The line 10 is interposed between a first machine $M_1$ and a second machine $M_2$, respectively arranged upstream and downstream of the movement direction W of the outward branch A of the line 10.

The first machine $M_1$ packs articles 2, for example syringes containing a predetermined substance, supplied to a first conveyor Ti exiting from the machine.

The second machine $M_2$ is destined to produce containers containing at least an article 2; the containers 20 are arranged in a transporter $T_2$ of the same machine $M_2$; by way of example, the containers 20 are realized by means of a heatformer $M_2$.

The first transporter $T_1$ ends at a first station $S_1$ situated at the start of the outward branch A; a first store 5 is associated to the station, which first store 5 is destined to receive empty trays 1.

First handling organs $K_1$ are located at the first station, which handling organs $K_1$ are schematically illustrated as they are of known type, and perform the following functions:
  removing at least a tray at a time from the first store 5 and inserting it into the station $S_1$;
  picking-up at least a tray at a time in arrival, via the line 10, upstream of the station $S_1$ and locating said tray in the first store 5;
  picking-up at least an article 2 from the transporter $T_1$ and inserting said article in a relative seating 1A in a tray 1 located in the station $S_1$, the tray 1 either coming from the return branch R of the line 10 or being collected from the first store 5.

A second station $S_2$ is afforded in the line 10 upstream of the downstream end of the outward branch A; a second store 15 is associated to the second station $S_2$, destined to receive full trays 1, i.e. containing one or more articles 2 arranged in the relative seatings 1A.

Second handling organs $K_2$ are located at the second station $S_2$, which second handling organs $K_2$ are schematically illustrated as they are of known type, and the functions of which are as follows:
  transferring, in agreement with what is described herein below, full trays 1 from the second station $S_2$, i.e. from the line 10 to the second store 15;
  transferring full trays from the second store 15 to the line 10 downstream of the second station $S_2$;
  transferring trays containing articles considered unsuitable from the second station $S_2$ to a parking area.

The parking area 50 can be substituted by a transporter transferring the non-conforming trays to a manual handling zone.

The second transporter $T_2$ is associated to a third station $S_3$ located on the line 10 downstream of the second station $S_2$. The third station $S_3$ comprises third handling organs $K_3$, also schematically illustrated as of known type, a function of which is to collect the articles 2 from the trays situated in the third station, with the aim of transferring the articles 2 internally of the containers 20 located on the second transporter $T_2$.

With the aim of defining a suitable phase relation between the movement of the trays 1 in the third station $S_3$ and the third handling organs $K_3$, a first cogged synchronizing transporter 150 is included, which enmeshes with the cogging 50 fashioned in each tray (FIG. 4).

With reference to the configuration of FIG. 1, the method of the invention comprises a preliminary aspect which includes the following preliminary stages:
  activating the first machine $M_1$ with a consequent sending of articles to the first transporter $T_1$;
  intermittently positioning the trays 1 in the first station S, with the trays which have either come from the return branch R of the line 10 or, alternatively, which have been collected by the first handling organs $K_1$ from the first store 5;
  inserting at least a corresponding article 2, by means of the first handling organs $K_1$, into the seating 1A of each tray 1 located in the first station $S_1$;
  transporting, via the line 10, full trays 1 from the first station $S_1$ to the second station $S_2$;
  transporting the full trays (1) from the first to the second station $S_2$ via the line (10);

transferring, by means of the second handling organs $K_2$, full trays from the second station $S_2$ to the second store 15 up to partial filling of the second store 15 to a predetermined level.

The method comprises an operating method, following the preliminary part, which includes following operating stages:

activating the second machine $M_2$ in suitable time relation with the completion of the partial filling of the second store 15;

transporting, via the line 10, each tray from the first station $S_1$ to the third station $S_3$, through the second station $S_2$;

collecting, using the third handling organs $K_3$, articles from each tray 1 located in the third station $S_3$ and placing the tray 1 in a corresponding container 20 of the second transporter $T_2$;

transporting, via the line 10, each tray emptied of the articles from the third station $S_3$ to the first station $S_1$;

using, by means of the third handling organs $K_1$, trays accumulated one behind another on the line 10 upstream of the first station $S_1$ alternatively to the trays situated in the first store 5;

repeating the above-described operating stages.

A halting of the first machine $M_1$ does not lead to the immediate shut-down of the second machine $M_2$, as the second machine $M_2$ is supplied first by the trays 1 on the branch of the line 10 situated between the first station S, and second station $S_2$, and thereafter by the trays collected by the second handling organs $K_2$ from the second store 15 and inserted on the line 10 up to exhaustion thereof. After emptying the store the second machine is deactivated $M_2$.

As the transporter T, is not supplied, the empty trays arriving in the station $S_1$ and coming from the third station $S_3$ are placed in the first store 5, by means of the first handling means $K_1$.

In a case in which the first machine $M_1$ temporarily halts, for a time of at least less than the time required for emptying the second store 15, the second machine $M_2$ is not halted.

The second machine $M_2$ is supplied with trays situated in the branch of the line situated between the first station S, and the second station $S_2$, and thereafter by the trays 1 picked-up by the second handling means $K_2$ from the second store and placed on the line, up to reactivation of the first machine $M_1$ which is done, as mentioned above, before emptying the second store 15.

The branch of line situated between the first station $S_1$ and the second station $S_2$ constitutes a sort of buffer; if the temporary halting of the machine is shorter than the emptying time of the branch of line, the second store 15 is not affected by the halt, i.e. trays are not removed therefrom.

The return to the normal operating condition is done by temporarily increasing the productivity of the first machine $M_1$ and/or temporarily reducing the productivity of the second machine $M_2$.

In the specific case of articles 2 constituted by syringes, the above-described return is preferably done, for example, by temporarily increasing the productivity of the first machine $M_1$ such as to restore both the flow of trays from the first station $S_1$ to the third station $S_3$, passing through the second station $S_2$, and the partial refilling of the second store 15.

In this case too, during the interval of time in which the first transporter $T_1$ does not supply articles 2 to the first station $S_1$, the first handling means $K_1$ locate the empty trays coming from the line 10 in the first store 5.

In the presence of a possible halting of the second machine $M_2$, the second handling means $K_2$ transfer the arriving trays into the second station $S_2$ from the second station $S_2$ to the second store 15, up until the second store 15 is completely full.

In time relation with the filling of the second store, the first station $S_1$ and the first machine $M_1$ are deactivated.

In a case where the halting of the second machine $M_2$ is temporary, for a shorter time than the time necessary for completely filling the second store, the first machine $M_1$ is not halted since the trays 1 arriving in the second station $S_2$ are diverted by the second handling means $K_2$ into the second store 15.

Before the second store 15 is completely filled, the second machine $M_2$, as specified, is reactivated; this leads to restoring transfer of the trays 1 from the second station $S_2$ to the third station $S_3$ and the gradual emptying of the second store 15, operated by the second handling means up to a predetermined amount. The above is actuated in the presence of a temporary reduction in productivity of the first machine $M_1$ and/or a temporary increase in productivity of the second machine $M_2$.

In the specific case in which the articles 2 are syringes, intervention is aimed, for example, at reducing the productivity of the first machine $M_1$.

The articles treated, for example syringes, can contain a special substance for which a predetermined maximum time is established for transfer of the syringes between the first station $M_1$ and the second machine $M_2$, beyond which the chemical-physical characteristics of the substance are compromised.

This aspect relates to the articles located in the trays in the second store 15.

There are two embodiments of the second store 15.

In a first embodiment, the first stored article is also the last to be unloaded; in a second type the first stored article is also the first to be unloaded.

In the first case it is necessary to intervene cyclically to empty the second store 15 in shorter times than the predetermined maximum time.

In the first case it is necessary to temporarily halt the first machine $M_1$, blocking the trays 2 coming from branch of line upstream of the second station $S_1$ in the first station S, and beginning the emptying of the second store 15 by the second handling organs $K_2$; the first machine $M_1$ is returned to operation in a suitable phase relation with the completing of the emptying of the second store 15.

The trays accumulating upstream of the station 52 are in part supplied to the store 15 and in part to the station 53.

To restore operating conditions it is necessary to temporarily increase the productivity of the first machine $M_1$ and/or to reduce the productivity of the second machine $M_2$.

In the second case the second handling means $K_2$ transfer each tray coming from the line 10 from the second station $S_2$ to the second store 15 and collect therefrom a previously-stored tray 1, supplying it to the third station $S_3$.

Organs (not illustrated) are associated to the second station $S_2$, which organs are for detecting the integrity of the articles 2 located in the trays 1; trays 1 containing articles 2 considered unsuitable are transferred by the second handling organs $K_2$ onto the parking area 50 where they are subsequently picked-up using various systems, for example manually or via a transporter on which the non-conforming trays are deposited.

As already described, the tray 1 can exhibit seatings 1A, destined to receive the articles 2, or auxiliary seatings 1B destined to receive auxiliary articles 2A; by way of example, the articles 2 are constituted by syringes, while the auxiliary articles 2A are needles coupling with the syringes.

In particular the tray 1 includes, for each seating 1A, a pair of auxiliary seatings 1B: for example for a pair of needles for each syringe.

The inserting of the auxiliary articles SA in the seatings 1A of the tray 1 is done in an auxiliary station SA situated on the line 10 in a position comprised between the first station $S_1$ and the second station $S_2$; the auxiliary articles 2A are supplied to the auxiliary station SA by a third transporter $T_3$ (see FIG. 2).

To obtain a predetermined phase relation between movement of the third transporter $T_3$ and the trays 1 arriving in the auxiliary station SA, a second cogged synchronizing transporter 250 is provided at the auxiliary station SA, which transporter 250 engages the cogging 50 fashioned in each tray 1 (FIG. 4).

The modalities of insertion of the auxiliary articles 2A in the relative seatings 1A have not been indicated, as they are well-known to an expert in the sector.

The presence of the auxiliary station SA, and the associated third transporter $T_3$ for supplying the auxiliary station SA with the auxiliary articles, does not change the combination of stages considered with reference to the basic configuration of the means of FIG. 1.

The activation and deactivation of the auxiliary station SA is subordinated respectively to the presence and absence, in the auxiliary station, of trays 1 containing at least an article 2; obviously in the second store 15 there will be trays 1, each of which containing at least an article 2 and an auxiliary article 2A.

In the third station $S_3$, the third handling organs $K_3$ collect the articles 2 and the auxiliary articles 2A from each tray in the station, with the aim of locating them in the containers 20.

Figure 2A:
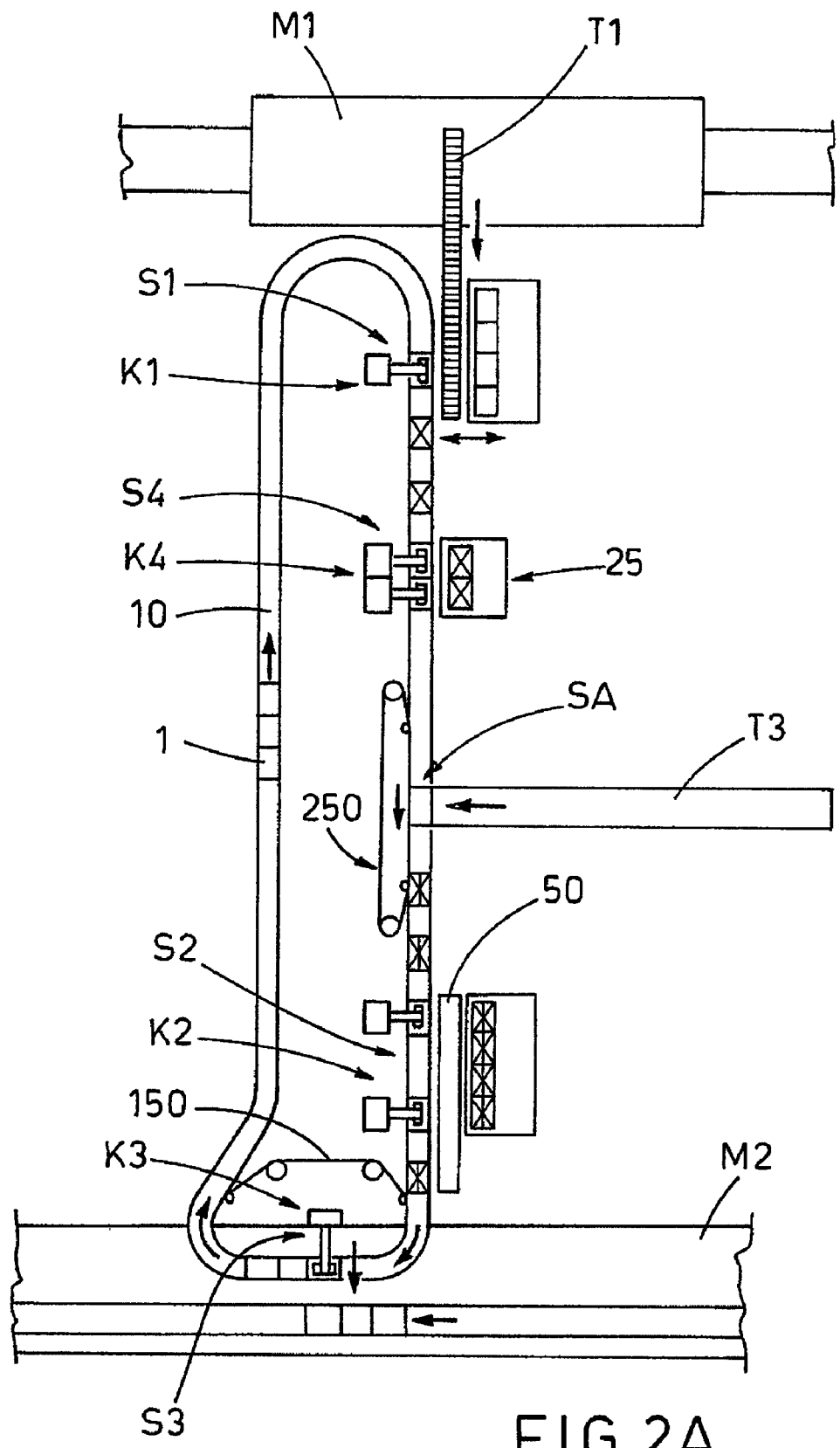
FIG. 2A illustrates the configuration of FIG. 2, comprising a further store located upstream of the auxiliary station.

In the configuration of FIG. 2A, a fourth station $S_4$ is included on the line 10 between the station $S_1$ and the auxiliary station SA, to which fourth station $S_4$ a third store 25 and fourth handling organs $K_4$ are associated; the function of the fourth handling organs $K_4$ is, when required, to transfer trays 1 containing at least an article 2 and present in the fourth station $S_4$ from the fourth station $S_4$ to the third store 25 when halts or malfunctioning occurs in the auxiliary station SA, as well as, when required, to pick-up trays 1 from the third store and reinsert them on the line 10 when halts or malfunctioning occurs in the first station S, and/or in devices upstream of the first station $S_1$.

The preliminary aspect of the proposed method also includes partial filling, to a predetermined amount, of the third store 25 with trays 1, each of which contains at least an article 2.

The partial filling of the third store 25 can proceed, follow or be actuated in suitable time relationship with the partial filling of the second store 15.

In the presence of an eventual halting of the second machine $M_2$, the first machine $M_1$ remains active according to the capacity of storage of at least the second store 15 and the third store 25. It should be stressed that the portions of the line 10 situated between the first station Si and the auxiliary station SA and between the auxiliary station SA and the third station $S_3$ constitute a sort of buffer for the trays 1; more precisely, trays 1 containing at least an article 2 between the first station $S_1$ and the auxiliary station SA and trays containing at least an article 2 and an auxiliary article 2A between the auxiliary station SA and the third station $S_3$.

If the second machine $M_2$ is deactivated for a period of time that exceeds the sum of the times required for completing the filling of both the second store 15 and the third store 25, the first machine $M_1$ is also halted.

If, on the contrary, the second machine $M_2$ is reactivated within a period of time which is less than the above-mentioned, the machine $M_1$ remains in service; the return to operating conditions is obtained by temporarily reducing the productivity of the first machine $M_1$ and/or by increasing the productivity of the second machine $M_2$.

With articles 2 constituted by syringes, the above is usually obtained by intervening only to reduce the productivity of the first machine $M_1$.

In the presence of a halt of the first machine $M_1$, the third station $S_3$ is supplied with the trays 1 collected from the second store 15, with the trays 1 collected from the third store 25 and with the trays in the outward branch A of the line 10. At least an auxiliary article 2A is inserted in each of the trays 1 (coming from the branch of line 10 upstream of the station as well as those collected from the third store 25) transiting in the auxiliary station SA.

Should the down time of the first machine $M_1$ be longer than the sum of the times necessary for emptying the second store 15 an the third store 25, the second machine $M_2$ too is halted; if on the contrary the time is less than the said sum of times, the second machine remains in service.

With reference to the above aspect, it is stressed that the portions of the branches of line situated between the first station $S_1$ and the fourth station $S_4$, between the fourth station $S_4$ and the second station $S_2$ constitute a sort of buffer; the buffer, together with the capacity of the third store 25 and the second store 15 enables the second machine $M_2$ to be kept in service even following the shutdown of the first machine, as described above.

The period out-of-service of the first machine $M_1$ can be of such a duration that only the first portion of the branch of line is emptied (in this case the third store 25 is not involved), or the first portion and the third store 25 (in this case the second store 15 is not involved) and so on, up to the second store 15.

With the provided method, the temporary halts of the first machine are absorbed progressively such as to keep the third station $S_3$ in operation.

On reactivation of the first machine $M_1$ the continuity of supply of the trays 1 from the first station $S_1$ to the third station $S_3$ is restored.

The restoring of operating conditions is done by a temporary increase in productivity of the first machine and/or a temporary reduction in the productivity of the second machine $M_2$. As already mentioned, if the articles 2 are syringes, it is preferable to intervene on the productivity of the first machine $M_1$.

The halting of the supply of auxiliary articles 2A to the auxiliary station SA (caused by problems with either the third transporter $T_3$ or the machine supplying the third transporter $T_3$ with the auxiliary articles) does not cause immediate halting of the first machine $M_1$ and the second machine $M_2$.

The first machine $M_1$ continues to function as the trays 1 containing at least an article 2 are diverted, by the fourth handling organs $K_4$, from the fourth station $S_4$ to the third store 25; also the second machine $M_2$ remains in service, as it is supplied both by the trays 1 (which are not in large numbers) on the branch of line 10 situated between the auxiliary station GA and the third station $S_3$, and, mainly, by the trays 1 collected from the second store 15.

If the halting of the supply of auxiliary articles 2A to the auxiliary station SA is shorter than the time required for completing the filling of the second store 15, both the machines stay in service. The restoring of operating conditions is done by intervening on the productivity of both the first machine $M_1$, and the third transporter $T_3$.

If the above-mentioned halting lasts long enough for the third store 25 to be filled, the first machine $M_1$, is halted;

reactivation of the first machine $M_1$ is subordinated to the reactivation of the third transporter $T_3$.

If the above-mentioned halting is protected for a length of time such that the second store 15 is emptied, the second machine $M_2$ is halted; the restarting of the second machine $M_2$ is subordinated to the reactivation of the third transporter $T_3$.

In a case in which the articles are constituted by articles (e.g. syringes) containing a substance for which, due to the physical-chemical properties thereof, a predetermined maximum time is allowed for transfer thereof between the first machine $M_1$ and second machine $M_2$, the same considerations as those in reference to the configurations of FIGS. 1 and 2 exist. In this case, it is necessary to replace the trays 1 in the third store 25 and the second store 15, either by emptying the stores themselves, or by means of a complete change of the trays contained therein.

Figure 3:
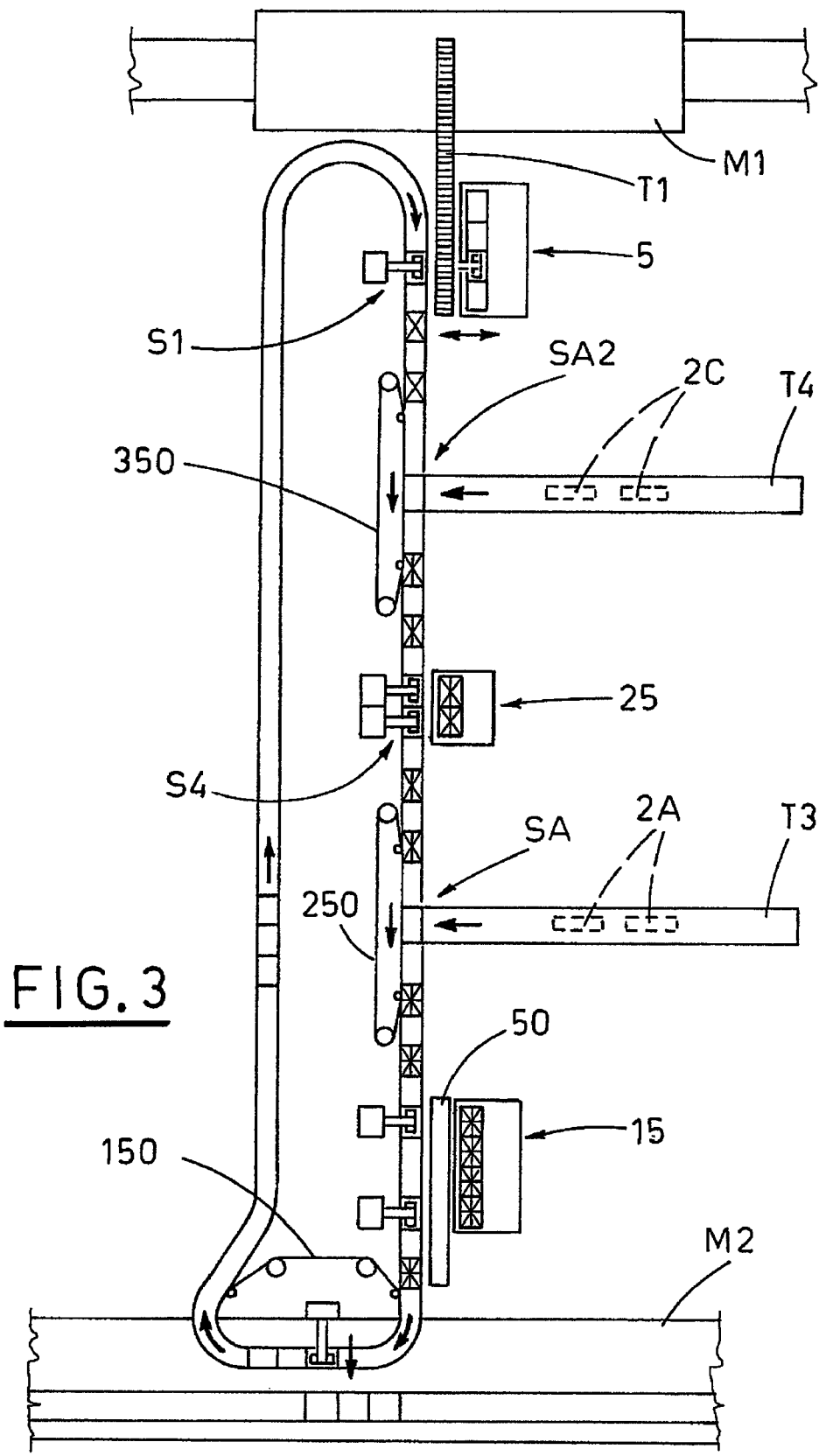
FIG. 3 illustrates, similarly to FIG. 2A, a configuration further comprising a second auxiliary station located upstream of the store associated to the first auxiliary station.
Figure 6:
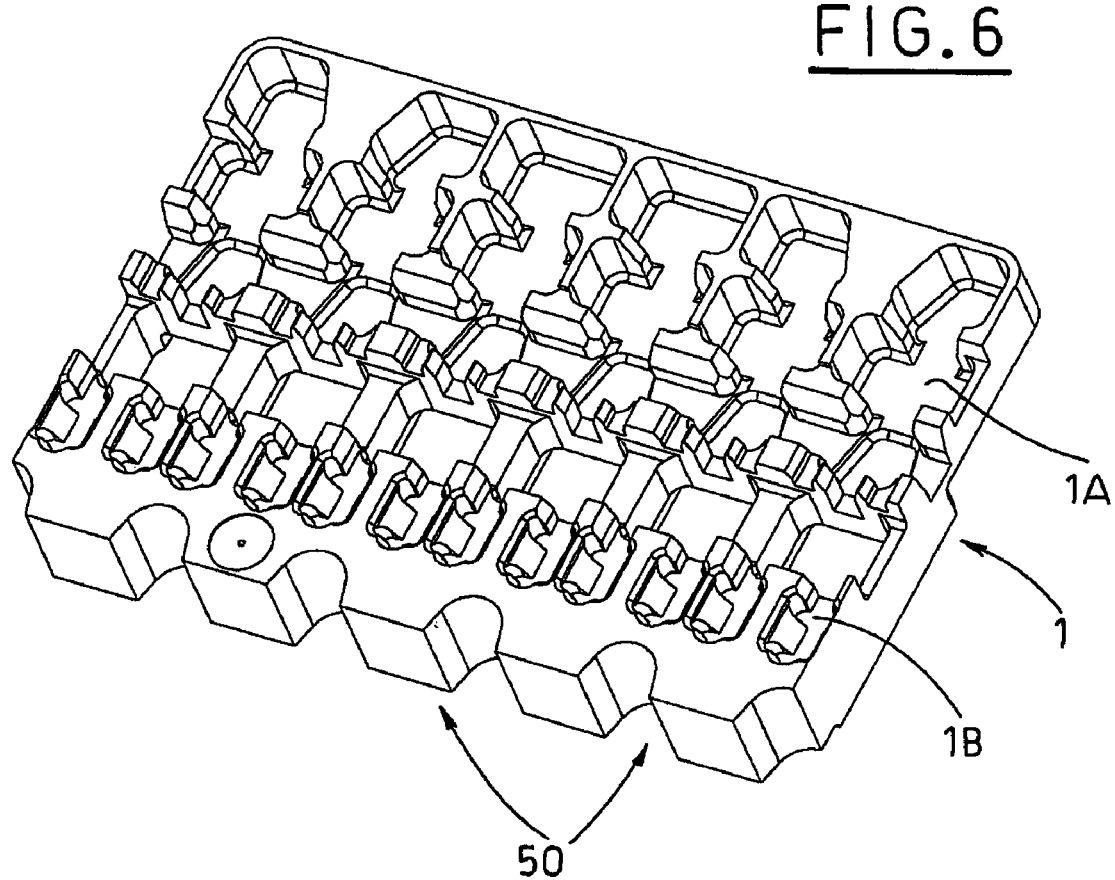
FIG. 6 is an axonometric view from below of the tray of FIG. 4.
Figure 5:
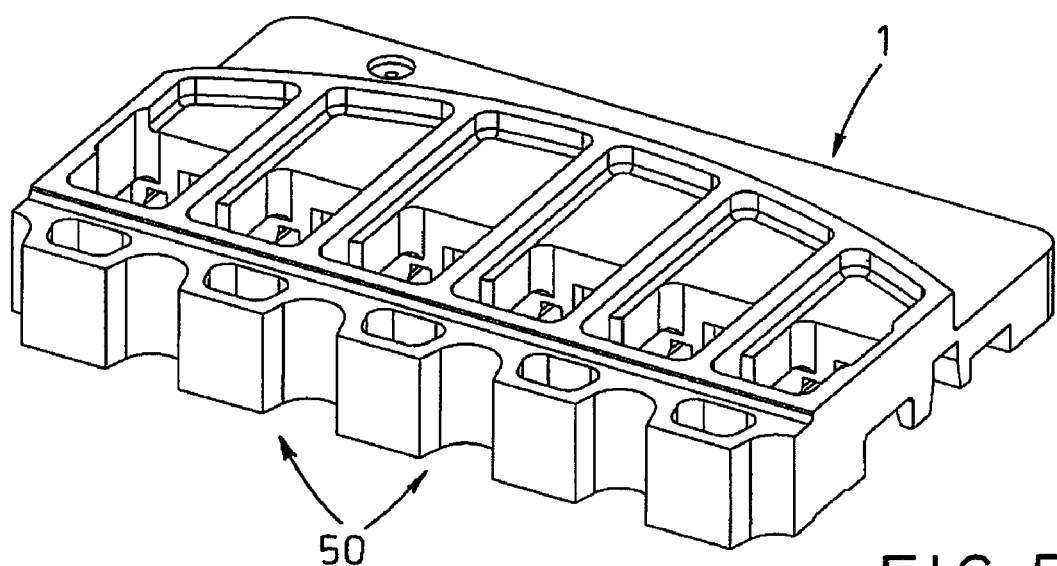
FIG. 5 is an axonometric view from above of the tray of FIG. 4.

The configuration of FIG. 3 differs from that of FIG. 2A in that it includes, associated to the line 10, a second auxiliary station $SA_2$ situated between the first station $S_1$ and the fourth station $S_4$; accessory articles 2C are supplied to the second auxiliary station $SA_2$ via a fourth transporter $T_4$, which accessory articles 2C are to be inserted in relative seatings afforded in the tray 1.

The definition of a suitable phase relationship between the movement of the trays 1, arriving from the second auxiliary station $SA_2$, and the fourth transporter $T_4$ is made by providing a third transporter 350 having synchronizing cogging at the position of the second auxiliary station $SA_2$, which cogging engages the cogging of each tray 1. Insertion of at least an accessory article 2C in the seating of the tray 1 is done in known ways (for an expert in the sector).

It follows from the above that trays 1 are located in the third store 25, each containing at least an article 2 and an accessory article 2C; obviously each tray 1 situated in the second store 15 will contain at least an article 2, an auxiliary article 2A and at least an accessory article 2C.

A fifth station (not illustrated) can be provided on the line 10, upstream of the second station $SA_2$, to which a relative fourth store (also not illustrated) can be associated, for storing trays containing at least an article 2.

In a variant, not illustrated, the second auxiliary station $SA_2$ can be arranged downstream of the auxiliary station SA, and the fifth station can be interposed between the auxiliary stations SA, $SA_2$; the fourth store in this case will contain trays in each of which at least an article 2 and at least an auxiliary article 2A are arranged.

With the provided method, the groups constituted by the trays each containing at least an article 2, an auxiliary article 2A and an accessory article 2C, are used both for transferring the articles between the various stations $S_1$-$S_4$ and to be located in the various stores 5, 15, 25.

This makes the filling and/or emptying of the stores rapid and easy both in the preliminary stages and in the act of halting one or another of the machines, all of which without in any way damaging the articles which are effectively protected by the relative seatings afforded in the trays, which is particularly advantageous in the presence of fragile and/or delicate articles.

In a case in which the halt is temporary and less than a predetermined time depending on the capacity of the stores, i.e. the time required for completing the filling of the stores and/or emptying them, the remaining machine remains in operation up to restoring of the operating conditions of both machines.

The method of the invention adapts, in real-time, to the various operating conditions to which both the first and second machine and the various operating systems for inserting articles in the trays associated to the various stations are subjected.

The above description is provided purely by way of non-limiting example, and any technical-functional variants of the stages defining the method will be considered to fall within the ambit of protection defined in the following claims.

What is claimed is:

1. A method for transferring articles from a first machine to a second machine which packs the articles in relative containers, actuation of which involves the use of a closed-ring transport line, interposed between the machines, for removably receiving and moving trays, each tray affording at least a seating shaped to complementarily receive an article, and a use of at least two stores, namely a first store and a second store for receiving the trays, the first store being associated to a first station located at a start of an outward branch of the line and the second store being associated to a second station located downstream of the first station in an advancement direction of the outward branch, the first store containing a predetermined number of trays at least before activation of the method, the method comprising:

a preliminary aspect which includes following preliminary stages:
intermittent positioning of trays in the first station with the trays coming either from a return branch of the line or collected from the first store;
inserting at least an article in the seating of each tray located in the first station;
transporting each tray containing the article via the line to the second station;
transferring the trays from the second station to the second store up until the second store is partially filled up to a predetermined level;
and an operative aspect, following the preceding preliminary aspect, which comprises following operating stages:
activating the second machine;
transporting, via the line, each tray from the first station to a third station, passing through the second station, with the third station being associated to a second transporter of the second machine, which second transporter carries the containers;
picking-up at least an article from each tray positioned in the third station and location thereof in a corresponding container of the second transporter, with successive transport, via the line, of the tray when emptied of the article, from the third station to the first station along the return branch of the line;
using the empty trays, in a timed relation with an arrival thereof carried on the line upstream of the first station, alternatively to the trays situated in the first store, for filling the empty trays carried on the line with corresponding articles collected from the first transporter;
repeating said operating stages.

2. The method of claim 1, wherein a halting of the first machine leads to:
supplying the trays, each containing at least an article, lying on a branch of line situated between the first station and the second station, to the third station;
in a suitable timed relation, on finishing the trays coming from the branch of the line, picking-up trays from the second store and inserting the trays in the transport line for sending the trays on to the third station, up to using all the trays with a consequent deactivation of the second machine;

transferring the empty trays arriving via the transport line upstream of the first station, from the transport line to the first store.

3. The method of claim 1, wherein a temporary halting in production of the articles by the first machine for a time which is at least less than an amount of time required for emptying the second store leads to:
supplying the trays, each containing at least an article, lying on a branch of line situated between the first station and the third station, to the third station;
in a suitable timed relation, on finishing the trays coming from the branch of the line, picking-up the trays from the second store and inserting the trays in the transport line for sending the trays on to the third station;
reactivating the first machine suitably prior to completing emptying the second store, with a consequent restoring of a sending of articles to the first station;
temporarily increasing productivity of the first machine and/or a temporarily reducing productivity of the second machine up to a re-establishing a predetermined filling of the second store, with a maintaining of the supply of trays, each containing at least an article, to the third station;
transferring, at least during the period in which the first transporter is deactivated, the empty trays, arriving on the line upstream of the first station, from the line to the first store.

4. The method of claim 1, wherein a halting of the second machine leads to:
transferring the trays coming from the line from the second station to the second store up to complete filling thereof;
deactivating, in the first station, a filling of the trays with at least an article for each tray on a completing of a filling of the second store;
halting the first machine in a timed relation with the filling of the second store.

5. The method of claim 1, wherein a temporary halting of the second machine for a shorter time than a time required for complete filling of the second store leads to:
transferring the trays coming from the line from the second station to the second store;
reactivating the second machine, suitably prior to completion of the refilling of the second store, with a consequent restoring of the sending of trays, each containing at least an article, to the third station;
temporarily reducing a productivity of the first machine and/or increasing a productivity of the second machine with a picking-up of trays from the second store, up to restoring a predetermined partial refilling of the second store.

6. The method of claim 1, wherein the articles contain a substance for which a predetermined maximum transfer time for said articles from the first machine to the second machine exists, and wherein the second store is conformed such that a first tray stored is also a last tray to be unloaded, which comprises, cyclically and according to timed periods which are shorter than the predetermined maximum time:
halting the first machine, with a consequent halting, in a suitable timed relation, of a sending of the articles via the first transporter to the first station;
in a suitable time relation with a finishing of trays coming from a branch of the transporter line situated upstream of the second station, picking-up trays from the second store and inserting the trays in the line in order to be transferred to the third station up to when the second store is emptied;
reactivating of the first machine, in a suitable timed relation with the completion of the emptying of the second store;
temporarily increasing and/or temporarily reducing productivity of the second machine such as to resume sending of the trays from the first station to the second station, without interrupting a flow of trays from the second station to the third station, with a contemporaneous filling of the second store with trays up to reaching the predetermined partial filling of the second store;
transferring, at least during the period in which the first transporter is deactivated, the empty trays on the transport line upstream of the first station, from the transport line to the first store.

7. The method of claim 1, wherein the articles contain a substance for which a predetermined maximum transfer time for said articles from the first machine to the second machine exists, and wherein the second store is conformed such that a first tray stored is also a first tray to be collected, which comprises:
transfer of the trays supplied to the second station to the second store;
unloading of the trays from the second store to a portion of the supply line situated downstream of the second station.

8. The method of claim 1, comprising use of a third transporter for supplying auxiliary articles to an auxiliary station situated on the transport line in an intermediate position between the first station and the second station, wherein the preliminary aspect further comprises:
insertion of at least an auxiliary article into each tray containing at least an article in the auxiliary station;
transport, by means of the line, of the trays, each tray containing at least an article and at least an auxiliary article, into the second station;
transfer of the trays from the second station to the second store up until the second store is partially filled;
and wherein the operating aspect comprises, in the third station, picking-up from each tray of the at least an article and at least an auxiliary article and placing thereof in a corresponding container borne on the second transporter.

9. The method of claim 8, wherein a halting of the first machine comprises:
a halting of the first transporter performed in phase relation with the halting of the first machine;
supplying trays, each containing at least an article, coming from the first station to the auxiliary station up to when the trays are finished;
inserting at least an auxiliary article in each tray supplied to the auxiliary station;
supplying the trays, lying on a branch of the line situated between the auxiliary station and the second station, to the third station;
picking-up trays, in a suitable time relation with finishing the trays coming from the branch of line, from the second store and inserting the trays on the line in order to forward the trays to the third station up to finishing the trays with a consequent deactivation of the second machine;
transfer of the empty trays in arrival on the line, upstream of the first station, from the line to the first store.

10. The method of claim 8, wherein a temporary halt in production of articles by the first machine, which halt is shorter than a time required for emptying the second store, leads to:

a temporary halting of the first transporter, actuated in phase relation with the temporary halt of the first machine;

supplying the trays, each containing at least an article, coming from the first station, to the auxiliary station, up until the trays are finished;

inserting in each tray supplied to the auxiliary station at least an auxiliary article;

supplying the trays, lying on the branch of line situated between the auxiliary station and the second station, to the third station;

picking-up, in a suitable timed relation with finishing the trays coming from the branch of line, trays from the second store and inserting the trays in the line for forwarding the trays to the third station;

reactivating the first machine and the first transporter suitably prior to completion of the emptying of the second store;

temporarily increasing productivity of the first machine and/or temporarily reducing productivity of the second machine up to restoring of a predetermined partial filling of the second store, while maintaining supply of the trays to the third station;

at least during the period in which the first transporter is deactivated, transferring the empty trays, in arrival on the line upstream of the first station, from the line to the first store.

11. The method of claim 8, wherein a halt of the second machine leads to:

a halt of the second transporter;

transfer of the trays, each containing at least an article and at least an auxiliary article, from the second station to the second store up to complete filling of the second store;

deactivating of the filling of the trays in the auxiliary station, each tray containing at least an article with at least an auxiliary article, on completion of filling of the second store;

halting of the first machine in a timed relation with completion of the filling of the second store.

12. The method of claim 8, wherein a temporary halt of the second machine for at least a shorter time than a time required for completely filling the second store leads to:

a temporary halting of the second transporter;

transfer of the trays, each containing at least an article and at least an auxiliary article, from the second station to the second store;

reactivating of the second machine and the second transporter suitably prior to completion of the filling of the second store, with a consequent restoring of the sending of the trays to the third station;

temporarily reducing productivity of the first machine and/or temporarily increasing productivity of the second machine, up to restoring the predetermined filling of the second store.

13. The method of claim 8, wherein the articles and/or the auxiliary articles contain a substance for which a maximum predetermined time in transferring the articles and/or the auxiliary articles from the first machine to the second machine exists, and wherein the second store is conformed such that a first tray stored is also a last tray to be unloaded, which cyclically comprises, in intervals of shorter times than the predetermined maximum time:

halting the first machine with a consequent deactivation of the first transporter associated thereto;

supplying the trays each containing at least an article coming from the first station, to the auxiliary station up to finishing the trays;

inserting at least the auxiliary article into each tray supplied to the auxiliary station;

supplying the trays, lying on the branch of the line situated between the auxiliary station and the second station, to the third station;

picking-up trays from the second store in a timed relation with finishing the trays coming from the branch of the line and inserting the trays in the line in order to forward the trays to the third station up to emptying the second store;

reactivating the first machine in suitable timed relation with completing the emptying of the second store, such as to restore sending of the trays from the first station to the auxiliary station, the second station, and the third station without interrupting a flow of the trays among the said stations, with a contemporary filling of the second store up to reaching the predetermined filling level of the second store;

transferring the empty trays situated on the transport line upstream of the first station from the transport line to the first store, at least during a period in which the first transporter is deactivated.

14. The method of claim 8, wherein the articles and/or the auxiliary articles contain a substance for which a maximum predetermined time in transferring the articles and/or the auxiliary articles from the first machine to the second machine exists, and wherein the second store is conformed such that a first tray stored is also a first tray to be unloaded, which comprises:

transferring trays supplied to the second station into the second store;

unloading the trays from the second store to the portion of the supply line situated downstream of the second station.

15. The method of claim 1, including use of a third transporter for supplying auxiliary articles to an auxiliary station situated on the transport line in an intermediate position between the first station and a second station, and a third store associated to a fourth station situated on the transport line in a position comprised between the first station and the auxiliary station, wherein the preliminary aspect further comprises:

transporting trays on the line, each tray containing at least an article, to the fourth station;

transferring the trays from the fourth station to the third store up to partially filling the third store to a predetermined amount;

transporting each tray containing at least an article on the line to the auxiliary station;

inserting at least an auxiliary article in each tray containing at least an article;

transporting the trays on the line, which trays containing at least an article and at least an auxiliary article, to the second station;

transferring the trays from the second station to the second store up to partially filling the second store;

and wherein the operating aspect comprises, in the third station, picking-up at least an article and at least an auxiliary article from each tray and placing the at least an article and the at least an auxiliary article into a corresponding container borne on the second transporter.

16. The method of claim 15, wherein a halting of the first machine leads to:

a halting of the first transporter in phase relation with a halting of the first machine;

supply of the trays, each containing at least an article, coming from the first station to the auxiliary station up to finishing the trays;

transferring trays, in a time relation with the emptying of the branch of the line upstream of the fourth station, from the third store to the line in order to forward the trays to the auxiliary station up to emptying the third store;

inserting, in each tray supplied to the auxiliary station, at least an auxiliary article;

supplying the trays, lying on the branch of the line situated between the auxiliary station and the second station to the third station;

picking-up trays, in a suitable timed relation with the finishing of the trays coming from the branch of line, from the second store and inserting them in the line in order to forward them to the third station up to finishing the trays, with a consequent deactivation of the second transporter and the relative second machine;

transferring the empty trays arriving upstream of the first station via the line, from the line to the first store.

17. The method of claim 15, wherein a temporary halt in production of articles by the first machine, which halt is less than at least a sum of times necessary for emptying the third store and the second store leads to:

temporary halting of the first transporter in suitable phase relation with the temporary halt of the first machine;

supplying the trays each containing at least an article coming from the first station to the auxiliary station up to finishing the trays;

transferring trays, in suitable time relation with emptying the branch of the line situated upstream of the fourth station, from the third store to the line for supplying the trays to the auxiliary station up to emptying the third store;

inserting at least an auxiliary article into each tray supplied to the auxiliary station;

supplying the trays, lying on the branch of the line situated between the auxiliary station and the second station, to the third station;

picking-up trays, in suitable phase relation with a finishing of the trays coming from the branch of line, from the second store and inserting the picked-up trays in the line in order to forward them to the third station;

reactivating the first machine suitably prior to completing the emptying of the second store;

temporarily increasing productivity of the first machine and/or temporarily reducing productivity of the second machine up until the predetermined partial filling of the third store has been completed, with trays each containing at least an article, and up until the partial filling of the second store has been completed, with trays each containing at least an article and at least an auxiliary article, with maintaining of supply of trays to the third station;

transferring empty trays in arrival on the line upstream of the first station from the first line to the first store, at least during the period in which the first transporter is deactivated.

18. The method of claim 15, wherein a halt of the second machine leads to:

a halting of the second transporter;

transferring the trays, each containing at least an article and at least an auxiliary article, from the second station to the second store up to complete filling thereof;

transferring the trays, each containing at least an article, from the fourth station to the third store up to complete filling of the third store;

deactivation in the first station of the filling of the trays with at least an article for each tray, on completion of the filling of the third store and the second store;

halting of the first machine in a timed relation with the completion of the filling of the second store and of the third store.

19. The method of claim 15, wherein a temporary halting of the second machine for a shorter time than at least a sum of the times required for the complete filling of the third store and of the second store leads to:

a halting of the second transporter;

transferring the trays, each containing at least an article and at least an auxiliary article, from the second station to the second store;

transfer of the trays, each containing at least an article from the fourth station to the third store;

maintaining of activation, in the first station, of the filling of the trays with at least an article for each tray on filling of the third store and the second store;

reactivation of the second machine suitably prior to completion of the filling of the third store, with a consequent restoring of sending of trays to the third station;

temporarily reducing productivity of the first machine and/or temporarily increasing productivity of the second machine, with a picking-up of trays from the third store and from the second store up to restoring predetermined partial filling of the third store and of the second store.

20. The method of claim 15, wherein the articles and/or the auxiliary articles contain a substance for which a maximum predetermined time in transferring the articles and/or the auxiliary articles from the first machine to the second machine exists, and wherein the third store and the second store are conformed such that a first tray stored is also a last tray to be unloaded, which cyclically comprises, in intervals of shorter times than the predetermined maximum time:

halting the first machine with a consequent deactivation of the first transporter associated thereto;

supplying the trays each containing at least an article, coming from the first station to the auxiliary station up to finishing the trays;

transferring the trays, in a timed relation with the emptying of the branch of the line upstream of the fourth station, from the third store to the line in order to forward the trays to the auxiliary station up to emptying the third store;

insertion of at least the auxiliary article into each tray supplied to the auxiliary station;

supplying the trays, lying on the branch of the line situated between the auxiliary station and the second station, to the third station;

picking-up the trays, in a suitable timed relation with finishing the trays coming from the branch of line, from the second store and inserting the picked-up trays in the line for forwarding them to the third station up to emptying the second store;

reactivating the first machine in suitable timed relation with completion of the emptying of the third store and of the second store, such as to restore the sending of the trays from the first station to the fourth station, the auxiliary station, the second station and the third station, without interrupting the flow of the trays between the said stations, with a filling of the third store and of the second store up to reaching the predetermined filling of the third store and of the second store;

transferring the empty trays situated on the transporter line upstream of the first station, at least during the period in which the first transporter is deactivated, from the line to the first store.

21. The method of claim 15, wherein the articles and/or the auxiliary articles contain a substance for which a maximum predetermined time in transferring the articles and/or the auxiliary articles from the first machine to the second machine exists, and wherein the third store and the second store are conformed such that a first tray stored therein is also a first tray to be unloaded therefrom, which comprises:
  transferring trays supplied to the fourth station into the third store;
  discharging the trays from the third store to the portion of line situated downstream of the fourth station;
  transferring trays supplied to the second station to the second store;
  unloading the trays from the second store to the portion of the supply line situated downstream of the second station;
  repeating the preceding stages up to complete absorption of the trays of both the third store and the second store.

22. The method of claim 15, wherein a halting of the third transporter leads to:
  supplying the trays, each containing at least an article, coming from the first station to the fourth station;
  transferring the trays from the fourth station to the third store;
  supplying the trays, each containing at least an article and at least an auxiliary article, from the auxiliary station to the second station;
  transferring the trays from the second store to the line, done in a timed relation with the emptying of the branch of line situated upstream of the second station;
  halting the first machine on completion of the filling of the third store with trays;
  halting the second machine on completion of the emptying of the second store.

23. The method of claim 15, wherein a temporary halting of the third transporter for a shorter time than both a time required for completion of the filling with trays of the third store and a time required for completion of emptying the second store comprises:
  supplying the trays, each containing at least an article coming from the first station, to the fourth station;
  transferring the trays from the fourth station to the third store;
  supplying the trays, each containing at least an article and at least a first auxiliary article, from the auxiliary station to the second station;
  transferring the trays from the second store to the line actuated in a timed relation with the emptying of the branch of line located upstream of the second station;
  reactivation of the third transporter actuated prior both to completion of the filling of the third store and prior to completion of the emptying of the second store;
  temporarily reducing productivity of the first machine and/or temporarily increasing of supply of auxiliary articles to the auxiliary station with a picking-up of trays from the third store and a loading of trays into the second store up to restoring the predetermined filling levels for the third store and the second store.

24. The method of claim 1, which comprises, at least at the second station, removal from the line of the trays either considered not to respond to predetermined parameters and/or containing at least an article considered not to conform to predetermined characteristics, and location of the removed trays in a parking area which does not interfere with the line, the first station, the second station, the third station, the fourth station and the auxiliary station and the first store, the second store and the third store.

25. The method of claim 8, which comprises, at least at the second station, removal from the line of the trays either considered not to respond to predetermined parameters and/or containing at least an article considered not to conform to predetermined characteristics, and location of the removed trays in a parking area which does not interfere with the line, the first station, the second station, the third station, the fourth station and the auxiliary station and the first store, the second store and the third store.

26. The method of claim 15, which comprises, at least at the second station, removal from the line of the trays either considered not to respond to predetermined parameters and/or containing at least an article considered not to conform to predetermined characteristics, and location of the removed trays in a parking area which does not interfere with the line, the first station, the second station, the third station, the fourth station and the auxiliary station and the first store, the second store and the third store.

* * * * *